United States Patent
Frederick et al.

(10) Patent No.: US 10,800,313 B2
(45) Date of Patent: Oct. 13, 2020

(54) VEHICLE CARGO ASSIST

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/883,356

(22) Filed: Jan. 30, 2018

(65) Prior Publication Data

US 2019/0232851 A1    Aug. 1, 2019

(51) Int. Cl.
*B60R 7/02*       (2006.01)
*B60P 1/54*       (2006.01)
*B60Q 9/00*       (2006.01)
*B60R 5/04*       (2006.01)

(52) U.S. Cl.
CPC .............. *B60P 1/5495* (2013.01); *B60Q 9/00* (2013.01); *B60R 5/04* (2013.01); *B60R 7/02* (2013.01)

(58) Field of Classification Search
CPC .................................... B60R 5/04; B60R 7/02
USPC ................... 414/547, 525.53, 554, 560, 469
See application file for complete search history.

(56) References Cited

U.S. PATENT DOCUMENTS

| | | | |
|---|---|---|---|
| 3,774,788 A | | 11/1973 | Sowers et al. |
| 4,671,731 A | * | 6/1987 | Harlan .................. B60P 1/5433 16/390 |
| 6,499,610 B2 | | 12/2002 | Spitsbergen |
| 7,717,663 B1 | | 5/2010 | Stowers |
| 7,891,718 B2 | * | 2/2011 | Heinaman ............... B66C 1/105 294/67.5 |
| 2004/0124222 A1 | | 7/2004 | Richter |
| 2007/0224025 A1 | * | 9/2007 | Ablabutyan .......... B60P 1/4442 414/546 |
| 2016/0023586 A1 | | 1/2016 | Potticary et al. |
| 2016/0346141 A1 | * | 12/2016 | Guertler ............... A61G 3/0808 |

FOREIGN PATENT DOCUMENTS

EP          2463225 A1      6/2012

* cited by examiner

*Primary Examiner* — Saul Rodriguez
*Assistant Examiner* — Willie Berry, Jr.
(74) *Attorney, Agent, or Firm* — Christopher G. Darrow; Darrow Mustafa PC

(57) ABSTRACT

A cargo assist can help a user in loading, unloading, and/or transporting items in a vehicle. The cargo assist can include a cargo assist arm. A cargo carrier can be operatively connected to the cargo assist arm and can be selectively disconnected therefrom. The cargo assist arm can be selectively movable between at least a stowed position and a deployed position. In the stowed position, the cargo assist arm can be located entirely within a cargo space of the vehicle. At least a portion of the cargo assist arm and at least a portion of the cargo carrier can be received within a recess defined within a first lateral side wall of the cargo space. In the deployed position, the cargo carrier and a portion of the cargo assist arm can extend through an access opening to the cargo space and can be located outside of the vehicle.

25 Claims, 9 Drawing Sheets

VEHICLE CARGO ASSIST

FIELD

The subject matter described herein relates in general to vehicles and, more particularly, to instances in which a vehicle is used to transport cargo.

BACKGROUND

Some motor vehicles have storage spaces located behind a passenger seating area. For example, minivans or sport utility vehicles have a relatively large rear cargo area. This area can be utilized in many different ways, including carrying or storing various types of cargo (e.g., tools, groceries, sporting equipment, etc.).

SUMMARY

In one respect, the present disclosure is directed to a cargo assist system for a vehicle. The vehicle can include a cargo space. The cargo space can be at least partially defined by a first lateral side wall and a second lateral side wall of the vehicle. A recess can be defined in the first lateral side wall. The system can include a cargo assist arm and a cargo carrier. The cargo assist arm can include a distal end region and a distal end. The cargo carrier can be operatively connected to the distal end region of the cargo assist arm. The cargo assist arm can be selectively movable between a plurality of positions, including a stowed position and a deployed position. In the stowed position, the cargo assist arm can be located entirely within the cargo space such that at least a portion of the cargo assist arm and at least a portion of the cargo carrier are received within the recess. In the deployed position, the cargo carrier and the distal end region of the cargo assist arm can extend through an access opening to the cargo space such that they are located outside of the vehicle.

In another respect, the present disclosure is directed to a cargo assist method for a vehicle. The vehicle can include a cargo space. The cargo space can be at least partially defined by a first lateral side wall and a second lateral side wall of the vehicle. A recess can be defined in the first lateral side wall. The vehicle can include a cargo assist arm having a distal end region and a distal end. A cargo carrier can be operatively connected to the distal end region of the cargo assist arm. The cargo assist arm can be selectively movable between a plurality of positions, including a stowed position in which the cargo assist arm is located entirely within the cargo space such that at least a portion of the cargo assist arm and at least a portion of the cargo carrier are received within the recess. The method can include, responsive to receiving a user input to deploy the cargo assist arm, causing the cargo assist arm to move from the stowed position to a deployed position. In the deployed position, the cargo carrier and the distal end region of the cargo assist arm extend through an access opening to the cargo space such that they are located outside of the vehicle.

DETAILED DESCRIPTION

Figure 1:
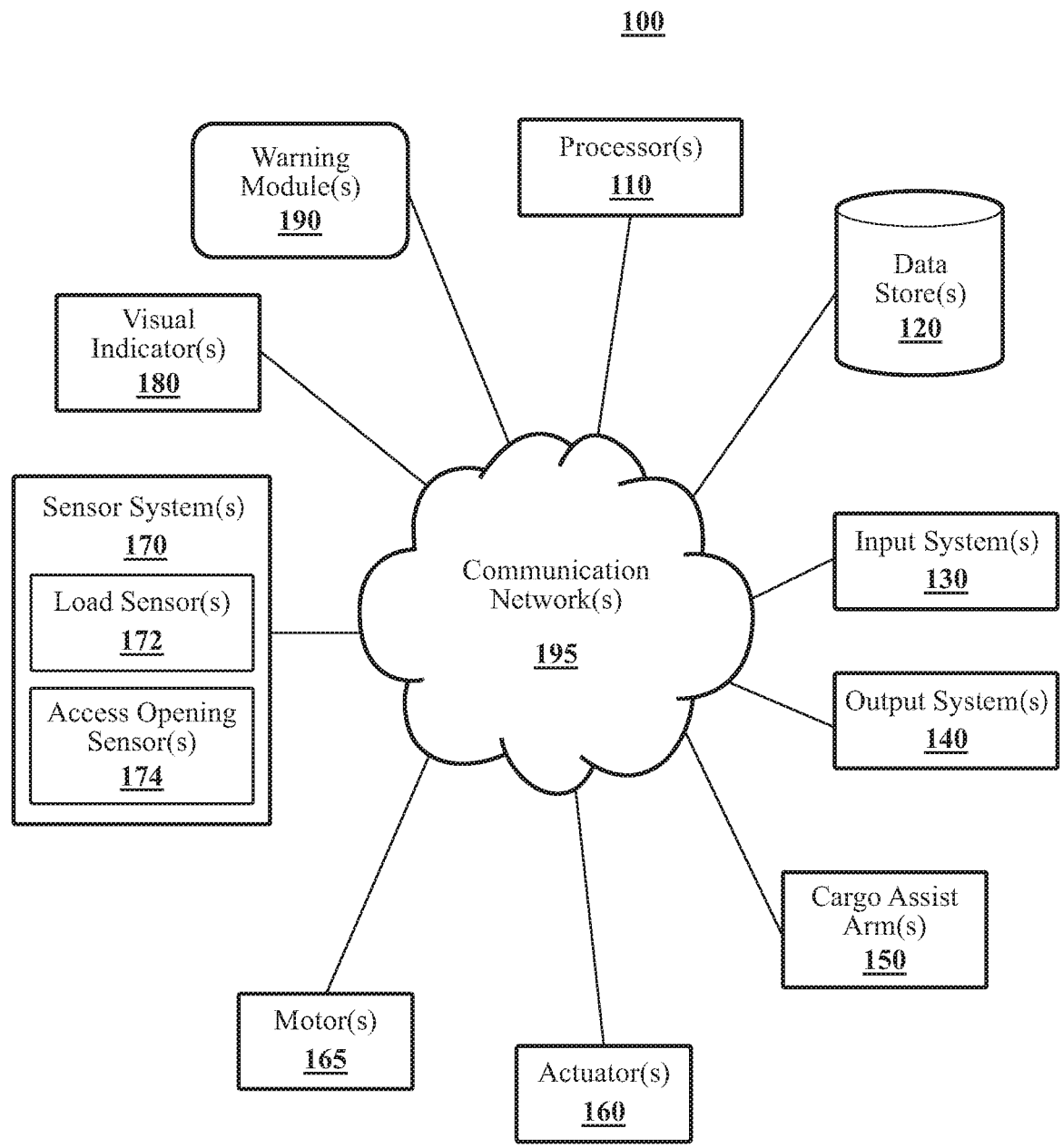
FIG. 1 is an example of a cargo assist system for a vehicle.

Some vehicle cargo can be heavy and/or cumbersome to lift into and/or out of a cargo area of a vehicle. As a result, a person can potentially be injured in performing such activities. Accordingly, this detailed description relates to assisting a user when loading cargo into, unloading cargo from, and/or transporting cargo within a vehicle. A vehicle can include a cargo assist arm and a cargo carrier operatively connected to the cargo assist arm. The cargo assist arm can be selectively movable between a plurality of positions, including a stowed position and a deployed position. In the stowed position, the cargo assist arm can be located entirely within a cargo space of the vehicle. Further, at least a portion of the cargo assist arm and at least a portion of the cargo carrier can be received within a recess, which can be defined in a structure that defines at least a portion of the cargo space. In the deployed position, the cargo carrier and a portion of the cargo assist arm can extend through an access opening to the cargo space such that they are located outside of the vehicle. The present detailed description relates to apparatus, systems, and/or methods that incorporate one or more of such features. In at least some instances, arrangements described herein can reduce the risk of injury to a user and/or reduce a user's effort in loading and/or unloading cargo into a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a cargo assist system 100 is shown. Some of the possible elements of the cargo assist system 100 are shown in FIG. 1 and will now be described. It will be understood that it is not necessary for the cargo assist system 100 to have all of the elements shown in FIG. 1 or described herein. The cargo assist system 100 can include one or more processors 110, one or more data stores 120, one or more input systems 130, one or more output systems 140, one or more cargo assist arms 150, one or more actuators 160, one or more motors 165, one or more sensor systems 170, one or more visual indicators 180, and/or one or more warning modules 190. In one or more arrangements, at least some of these various elements can be located onboard a vehicle. In one or more arrangements, all of the various elements can be located onboard a vehicle.

The various elements of the cargo assist system 100 can be communicatively linked to each other (or any combination thereof) through one or more communication networks 195. As used herein, the term "communicatively linked" can include direct or indirect connections through a communication channel or pathway or another component or system. A "communication network" means one or more components designed to transmit and/or receive information from one source to another. The data store(s) 120 and/or one or more of the elements of the cargo assist system 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The one or more communication networks 195 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network(s) 195 can include wired communication links and/or wireless communication links. The communication network(s) 195 can include any combination of the above networks and/or other types of networks, now known or later developed.

Each of the above noted elements of the cargo assist system 100 will be described in turn below. The cargo assist system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The cargo assist system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The cargo assist system 100 can include one or more input systems 130. An "input system" includes any device, component, system, element or arrangement or groups thereof that enable information, data, instructions, and/or commands to be entered into a machine. The input system(s) 130 can be configured to receive an input from a user. The input system(s) 130 can include one or more user interface elements, including, for example, keypad(s), display(s), touch screen(s), multi-touch screen(s), button(s), switch(s), dial(s), joystick(s), a mouse/mice, trackball(s), microphone(s), and/or combinations thereof. In one or more arrangements, the input system(s) 130 can be configured to receive user inputs relating to the cargo assist system 100. In one or more arrangements, the input system(s) 130 can be configured to receive user inputs relating to the cargo assist system 100 as well as to other things. In one or more arrangements, the input system(s) 130 can be provided in any suitable location onboard a vehicle, including on the exterior of the vehicle, within the interior of the vehicle, within a cargo space of the vehicle, and/or on the cargo assist arm(s) 150. In one or more arrangements, the input system(s) 130 can be provided on a remote device and/or a portable device, such as a key fob or a portable communication device (e.g., smart phone, tablet computer, etc.).

The cargo assist system 100 can include one or more output system(s) 140. An "output system" includes any device, component, system, element or arrangement or groups thereof that enable information or data to be presented to a user (e.g., a person, a vehicle occupant, etc.). Some components may serve as both a component of the input system(s) 130 and a component of the output system(s) 140. The output system(s) 140 can include display(s), speaker(s), projector(s), any of the items noted above in connection with the input system(s) 130, and/or combinations thereof. In one or more arrangements, the output system(s) 140 can be provided in any suitable location onboard a vehicle, including on the exterior of the vehicle, within the interior of the vehicle, within a cargo space of the vehicle, and/or on the cargo assist arm(s) 150. In one or more arrangements, the output system(s) 140 can be provided on a remote device and/or a portable device, such as a key fob or a portable communication device (e.g., smart phone, tablet computer, etc.).

The cargo assist system 100 can include one or more cargo assist arms 150. The cargo assist arm(s) 150 can be configured to facilitate a user in loading cargo into, unloading cargo from, and/or transporting cargo within a vehicle. The cargo assist arm(s) 150 can any suitable configuration, and various examples will be described herein. The cargo assist arm(s) 150 can be movable between a plurality of positions. For instance, the plurality of positions can include a stowed position and a deployed position. Examples of these and other positions will be described herein. In one or more arrangements, the movement of the cargo assist arm(s) 150 can be controlled by the processor(s) 110. In one or more arrangements, the movement of the cargo assist arm(s) 150 can be performed, at least in part, manually by a person.

The cargo assist system 100 can include one or more actuators 160. The actuator(s) 160 can be operatively connected to the cargo assist arm(s) 150. The actuator(s) 160 can include pneumatic actuators, hydraulic pistons, relays, solenoids, and/or piezoelectric actuators, just to name a few possibilities. The actuator(s) 160 can include piston(s), push and/or pull bar(s) or rod(s), pulley(s), gear(s), gear track(s), magnet(s), winch(es), hoist(s), and/or combinations thereof, just to name a few possibilities. The actuator(s) 160 can be selectively activated to cause the cargo assist arm(s) 150 to be moved into and out of various positions (e.g., the stowed position, the deployed position, etc.). In one or more arrangements, the actuator(s) 160 can be activated responsive to receiving signals or other inputs from a user, such as via the input system(s) 130.

The cargo assist system 100 can include one or more motors 165. The motor(s) 165 can be any suitable type of motor, now know or later developed. The motor(s) 165 can be selectively activated to cause movement of the cargo assist arm(s) 150 between the plurality of positions. The motor(s) 165 can be activated responsive to receiving signals or other inputs from a user, such as via the input system 130. The motors(s) 165 can be operatively connected to the one or more actuator(s) 160.

The cargo assist system 100 can include one or more sensor systems 170. The sensor system(s) 170 can include one or more sensors. "Sensor" means any device, component and/or system that can detect, determine, assess, measure, quantify and/or sense something, directly or indirectly. The one or more sensors can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the sensor system(s) 170 includes a plurality of sensors, the sensors can work independently from each other or one or more of the sensors can work in combination with each other. The sensor system(s) 170 and/or one or more sensors of the sensor system(s) 170 can be operatively connected to the processor(s) 110, the data store(s) 120, the warning module(s) 190, and/or other element, system and/or component of the cargo assist system 100. The processor(s) 110, the warning module(s) 190, and/or other element, system and/or component of the cargo assist system 100 can process data or information acquired by the one or more sensors to determine something.

The sensor system(s) 170 include any suitable type of sensor(s). For instance, the sensor system(s) 170 can include the one or more load sensors 172. The one or more load sensors 172 can be configured to detect, determine, assess, measure, quantify and/or sense, directly or indirectly, information about weight or load carried by the cargo assist arm(s) 150 and/or the weight or load of a cargo carrier (including items in the cargo carrier) that is operatively connected to the cargo assist arm(s) 150. In one or more arrangements, the load sensor(s) 172 can be a weight sensor. In one or more arrangements, the load sensor(s) 172 can be a torque sensor for the motor(s) 165.

As another example, the sensor system(s) 170 can include one or more cargo space access opening sensors 174. In one or more arrangements, the cargo space access opening sensors 174 can be configured to detect, determine, assess, measure, quantify and/or sense, directly or indirectly, whether an access opening to a cargo space of a vehicle is opened or closed. Alternatively or additionally, the cargo space access opening sensors 174 can, in one or more arrangements, be configured to detect, determine, assess, measure, quantify and/or sense, directly or indirectly, whether an access opening to a cargo space of a vehicle is sufficiently open and/or not sufficiently open. For instance, access to a cargo space of a vehicle can be permitted through a rear door of the vehicle. In such case, the cargo space access opening sensors 174 can be configured to detect, determine, assess, measure, quantify and/or sense, directly or indirectly, whether the rear door is opened, closed, sufficiently open, and/or not sufficiently open. "Sufficiently open" means that an a closing structure (e.g., a door) of an access opening is partially open to a point where the cargo assist arm(s) 150 can pass through the access opening without obstruction and/or interference by the closing structure. "Not sufficiently open" means that the closing structure is partially open but the cargo assist arm(s) 150 cannot pass through the access opening without obstruction and/or interference by the closing structure. The cargo space access opening sensors 174 can be any suitable sensor, now known or later developed, including proximity sensors, contact sensors, gap sensors, optical sensors, etc.

The cargo assist system 100 can include one or more visual indicators 180. In one or more arrangements, the one or more visual indicators 180 can include a plurality of light sources. The plurality of light sources can generate or emit any type of light energy. In one or more arrangements, the plurality of light sources can be electric-powered. In one or more arrangements, the plurality of light sources can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the plurality of light sources can be light emitting diodes (LEDs). The processor(s) 110 can be operatively connected to the plurality of light sources. Thus, the activation and deactivation of the plurality of individual lights sources can be selectively controlled by the processor(s) 110. The visual indicator(s) 180 can be provided in any suitable location on or in the vehicle, including, for example, in a cargo space and/or on the cargo assist arm(s) 150.

In one or more arrangements, the cargo assist system 100 can include one or more warning modules 190. The warning module(s) 190 can be implemented as computer readable program code that, when executed by a processor, implement one or more of the various processes described herein. The warning module(s) 190 can be a component of the processor(s) 110, or the warning module(s) 190 can be executed on and/or distributed among other processing systems to which the processor(s) 110 is operatively connected. The warning module(s) 190 can include instructions (e.g., program logic) executable by one or more processor(s) 110. Alternatively or in addition, one or more data store 120 may contain such instructions.

The warning module(s) 190 can be configured to determine when the cargo assist arm(s) 150 is/are overloaded. The warning module(s) 190 can make such a determination in any suitable manner. For instance, using data acquired by the one or more load sensors 172, the warning module(s) 190 can compare a determined weight of the cargo carrier (including any items located therein) to a predetermined weight threshold. When the determined weight is greater than the predetermined weight threshold, the warning module(s) 190 can be configured to present a warning or an alert and/or to cause a warning or an alert to be presented. As another example, using data acquired by the one or more load sensors 172, the warning module(s) 190 can compare a determined torque of the motor(s) 165 to a predetermined torque threshold. When the determined torque is greater than the predetermined torque threshold, the warning module(s) 190 can be configured to present a warning or an alert and/or to cause a warning or an alert to be presented.

In some instances, the warning module(s) 190 can be configured to determine when an access opening to a cargo space of a vehicle in which the cargo assist arm(s) 150 are located is obstructed. For instance, using data acquired by the cargo space access opening sensors 174, the warning module(s) 190 can determine whether a rear door of a vehicle is closed, open, sufficiently open, and/or not sufficiently open. When the rear door is closed or not sufficiently open, the warning module(s) 190 can be configured to present a warning or an alert or cause a warning or an alert to be presented.

In one or more arrangements described herein, at least a portion of the output system 140 and/or other component of the system can be activated to provide a warning. The warning can be any type of warning, including, for example, a visual warning. "Visual warning" is any output that provides an alert or warning in a manner that is perceptible to the human sense of sight. The visual warning can be presented by one or more components of the cargo assist system 100 (e.g., one or more components of the output system 140 and/or the one or more visual indicators 180). The visual warning can have any suitable form. In one or more arrangements, the visual warning can include one or more words, one or more phrases, one or more symbols, one or more pictures, and/or one or more messages. The visual warning can be presented on a display. Alternatively or in addition, the visual warning can be presented by activating and/or deactivating one or more light sources.

The warning can be an audial warning. "Audial warning" is any output that provides an alert or warning in a manner that is perceptible to the human sense of hearing. The audial warning can be presented by one or more components of the output system 140, such as by being emitted over one or more speakers. The audial warning can have any suitable form. The audial warning can include one or more sounds, one or more words, one or more phrases, and/or one or more messages.

In some instances, which may be in addition to or as an alternative to the above, the warning module(s) 190 can be configured to ignore or cancel a user input. For instance, when the warning module(s) 190 determines that an access opening to the cargo space is closed or is not sufficiently open, the warning module(s) 190 can be configured to ignore or cancel a user input that would cause a movement of the cargo assist arm(s) 150 that would impinge upon a structure (e.g., a door) that is causing the access opening to be closed or not sufficiently open.

Figure 2:
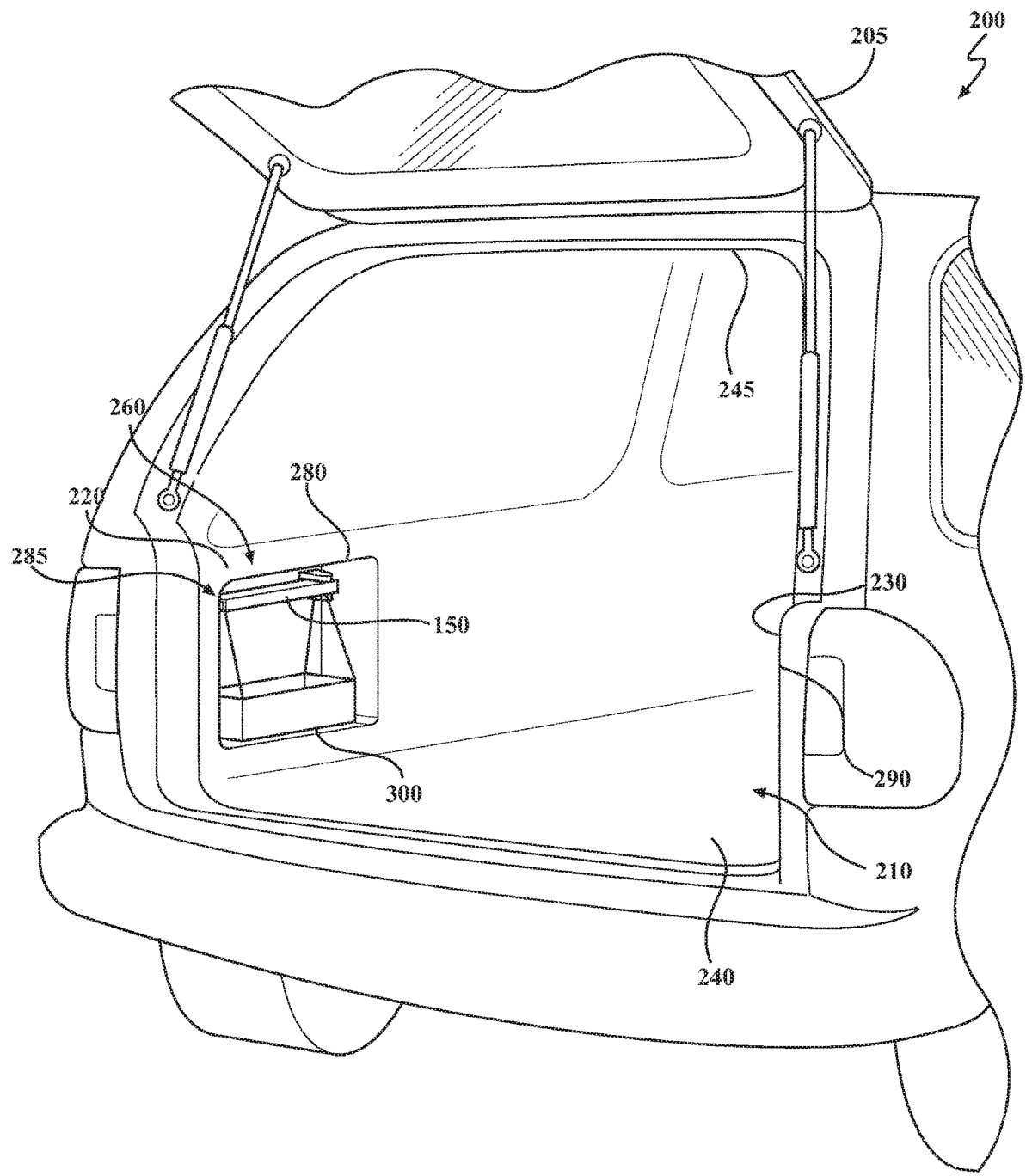
FIG. 2 is an example of a cargo assist arm in a stowed position.

Referring to FIG. 2, arrangements described herein can be used in connection with a vehicle 200. As used herein, "vehicle" means any form of motorized transport. In one or more implementations, the vehicle 200 can be an automobile. While arrangements will be described herein with respect to automobiles, it will be understood that embodiments are not limited to automobiles. In some implementations, the vehicle may be a watercraft, an aircraft or any other form of motorized transport. In one or more implementations, the vehicle 200 can be a van, a mini-van, a sport utility vehicle, or a vehicle with a large access opening (e.g., a door) to a cargo space.

The vehicle 200 can include a cargo space 210. In one or more arrangements, the cargo space 210 can be located in a rear portion of the vehicle 200. The cargo space 210 can be defined by one or more structures of the vehicle 200. For instance, the cargo space 210 can be at least partially defined by a first lateral side wall 220 and a second lateral side wall 230. In one or more arrangements, the first lateral side wall 220 and/or the second lateral side wall 230 can be defined by one or more vehicle pillars. As an example, the first lateral side wall 220 and/or the second lateral side wall 230 can be defined by a D-pillar of the vehicle. The cargo space 210 can further be defined by a floor 240, a ceiling 245, and/or at least a portion of one or more seats of the vehicle 200 (see, e.g., rear seats 270 in FIGS. 3-4).

One or more of the structures defining the cargo space 210 can include a recess 280. In one or more arrangements, the recess 280 can be defined in the first lateral side wall 220 and/or the second lateral side wall 230. The recess 280 can have any suitable size, shape, and/or configuration. The recess 280 can open to the cargo space 210. The recess 280 can be configured to receive at least a portion of the cargo assist arm(s) 150 and/or at least a portion of a cargo carrier 300 operatively connected to the cargo assist arm(s) 150.

In some instances, the recess 280 can be configured to retain the cargo assist arm(s) and/or the cargo carrier 300 when in the stowed position. For example, the recess 280 can include one or more connectors, one or more fasteners, one or more straps, one or more tie downs, one or more bungee cords, and/or one or more tethers, just to name a few possibilities. In one or more arrangements, the recess 280 can include one or more locking elements to hold the cargo assist arm(s) and/or the cargo carrier 300 in place. In one or more arrangements, the recess 280 can be configured, sized, and/or shaped to hold the cargo assist arm(s) and/or the cargo carrier 300 in place through frictional engagement 285.

The vehicle 200 can include one or more access openings 290 to enable a user to access the cargo space 210 from outside of the vehicle 200. For instance, the cargo space 210 can be accessed through an access opening 290 in a rear portion of the vehicle 200. The access opening 290 can be selectively opened and closed by a closing structure (e.g., a rear door 205) of the vehicle 200.

Figure 4:
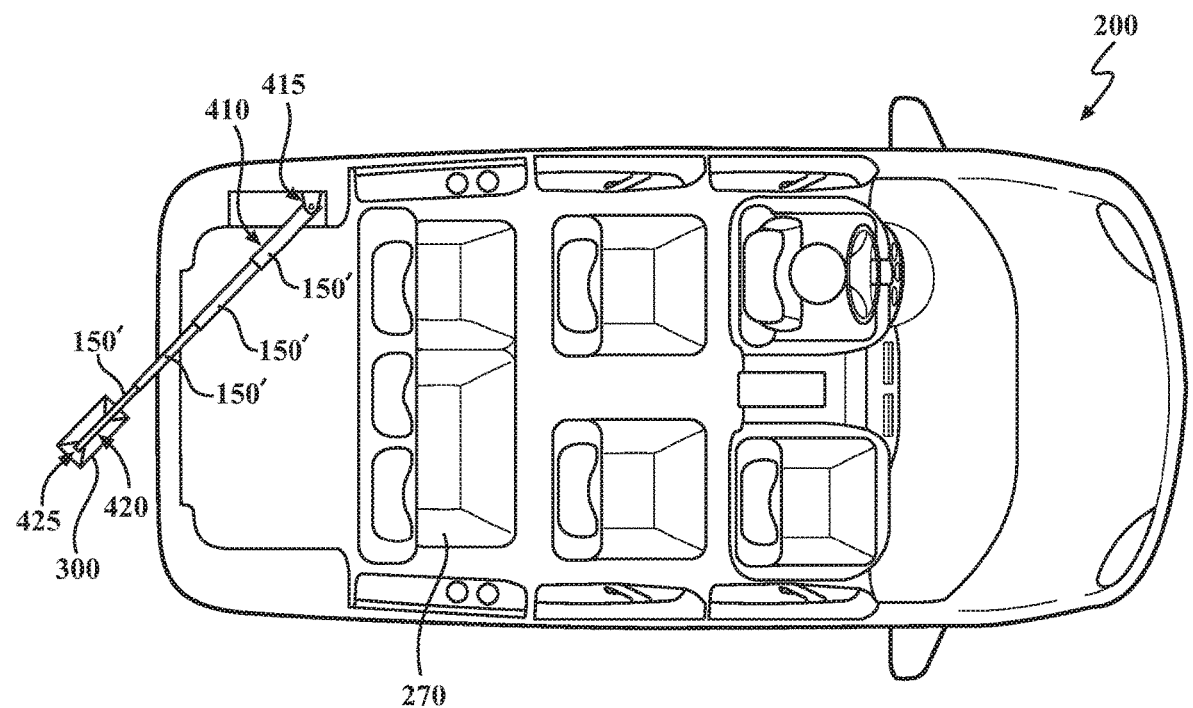
FIG. 4 is an example of the cargo assist arm in the deployed position, showing a portion of the cargo assist arm extending outside of the vehicle.

As noted above, the cargo assist system 100 can include one or more cargo assist arms 150. The cargo assist arm(s) 150 can have any suitable configuration. In one or more arrangements, the cargo assist arm(s) 150 can have a generally straight body and an associated length. The cargo assist arm(s) 150 can have a proximal end region 410 and a proximal end 415, as is shown in FIG. 4. The cargo assist arm(s) 150 can have a distal end region 420 and a distal end 425. The cargo assist arm(s) 150 can be made of any suitable material, such as metal. The cargo assist arm(s) 150 can be made of a material with high strength properties.

The cargo assist arm(s) 150 can be attached to a structure within the vehicle 200, such as within the recess 280 or in some other location. The cargo assist arm 150(*s*) can be movably attached to a structure within the vehicle 200. For example, in one or more arrangements, the cargo assist arm(s) 150 can be pivotably attached to the first lateral side wall 220 or the second lateral side wall 230, such as within the recess 280. The cargo assist arm(s) 150 can, in one or more arrangements, pivot within a substantially horizontal plane. As used herein, the term "substantially" includes exactly the term it modifies and slight variations therefrom. Thus, the term "substantially horizontal plane" means exactly within a horizontal plane and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less. In one or more arrangements, the cargo assist arm(s) 150 can be configured to pivot in one or more non-horizontal planes.

The cargo assist arm(s) 150 can have any suitable range of pivoting motion. In one or more arrangements, the cargo assist arm(s) 150 can pivot at least about 90 degrees within the cargo space 210. However, it will be understood that the cargo assist arm(s) 150 may have a range of pivoting motion that is greater or less than 90 degrees.

It will be appreciated that, alternatively or in addition to pivoting motion, the cargo assist arm(s) 150 can be configured for other types of motion. For instance, in some arrangements, the cargo assist arm 150 can move in a rotational, reciprocating, oscillating, translational, rectilinear, curvilinear, telescopic, and/or non-linear manner. In some instances, the cargo assist arm(s) 150 can be locked in place when the cargo assist arm 150 is moved to a desired position or location.

The cargo assist arm(s) 150 can have an associated length. In one or more arrangements, the length of the cargo assist arm(s) 150 can be adjustable. For instance, the cargo assist arm(s) 150 can include a plurality of arm segments 150' (see, e.g., FIG. 4). The plurality of arm segments 150' can be configured for arrangement in a nested manner. In this way, the length of the cargo assist arm(s) can be selectively adjustable by telescopic motion of the plurality of arm segments 150'. However, it will be appreciated that other manners of adjusting the length of the cargo assist arm(s) 150, now know or later developed, are possible. Examples of other ways in which the length of the cargo assist arm(s) 150 can be adjusted include pivotable or sliding movement of the arm segments 150', or the cargo assist arm(s) 150 can be provided in an accordion or bellows type of configuration.

The cargo assist arm(s) 150 can be selectively movable between a plurality of positions. The movement of the cargo assist arm(s) 150 can be caused by the one or more actuators 160 and/or the one or more motors 165. The one or more motors 165 can be housed in any suitable portion of the vehicle 200, including for example, in the first lateral side wall 220, the second lateral side wall 230, the floor 240, and/or the ceiling 245. In some instances, the motor(s) 165 may not be visible to a person during normal use. In one or more arrangements, the motor(s) 165 can be housed within the D-pillar 260 of the vehicle 200. In some implementations, at least some of the movement of the cargo assist arm(s) 150 can be caused by manual manipulation of the cargo assist arm 150.

The plurality of positions of the cargo assist arm(s) 150 can include a stowed position and a deployed position. An example of the stowed position is shown in FIG. 2. When the cargo assist arm 150 is in the stowed position, the cargo assist arm 150 can be located entirely within the cargo space 210 such that at least a portion of the cargo assist arm 150 and/or at least a portion of the cargo carrier 300 are received within the recess 280. In one or more arrangements, in the stowed position, a majority of the cargo assist arm 150 and/or a majority of the cargo carrier 300 can be received within the recess 280. In one or more arrangements, in the stowed position, the cargo assist arm 150 and/or the cargo carrier 300 can be received entirely within the recess 280. When in the stowed position, it will be appreciated that a user will have full or nearly full use of the cargo space 210 with little or no obstruction from the cargo assist arm 150 and/or the cargo carrier 300. In some instances, the cargo carrier 300 may be able to house items therein when in the stowed position.

Various examples of the deployed position are shown in FIGS. 4, 6, 7, and 8. When the cargo assist arm 150 is in the deployed position, the cargo carrier 300 and the distal end region 420 of the cargo assist arm 150 can extend through the access opening 290 such that they are located outside of the vehicle 200. In the deployed position, a user can detach the cargo carrier 300 from the cargo assist arm 150. Thus, the cargo carrier 300 can be used away from the vehicle 200.

Figure 3:
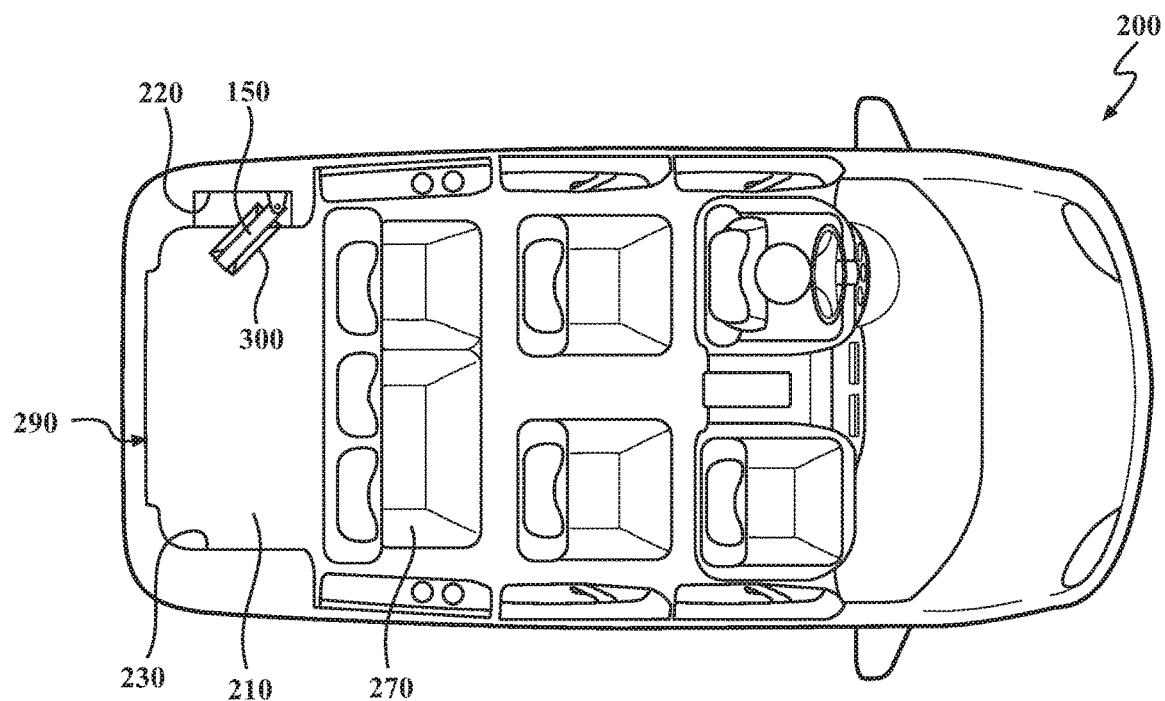
FIG. 3 is an example of the cargo assist arm in the process of moving into a deployed position, showing the cargo assist arm pivoted from the stowed position.

The movement of the cargo assist arm 150 to the deployed position can be achieved in any suitable manner. In one implementation, the cargo assist arm 150 can be initially pivoted from the stowed position. For example, the cargo assist arm 150 can be pivoted from about 20 degrees to about 70 degrees, from about 30 degrees to about 60 degrees, from about 40 degrees to about 50 degrees, or about 45 degrees relative to the stowed position. An example of such pivoting motion is shown in FIG. 3. Once pivoted to a desired position, the length of the cargo assist arm 150 can be adjusted so that its length increases to the deployed position. Such adjusting of the length can be achieved by the telescopic movement of the arm segments 150' described above. An example of such telescopic motion is shown in FIG. 4. The motions of the cargo assist arm 150 shown in FIGS. 3 and 4 can be achieved by, for example, the actuator(s) 160 and/or the motor(s) 165.

Figure 5:
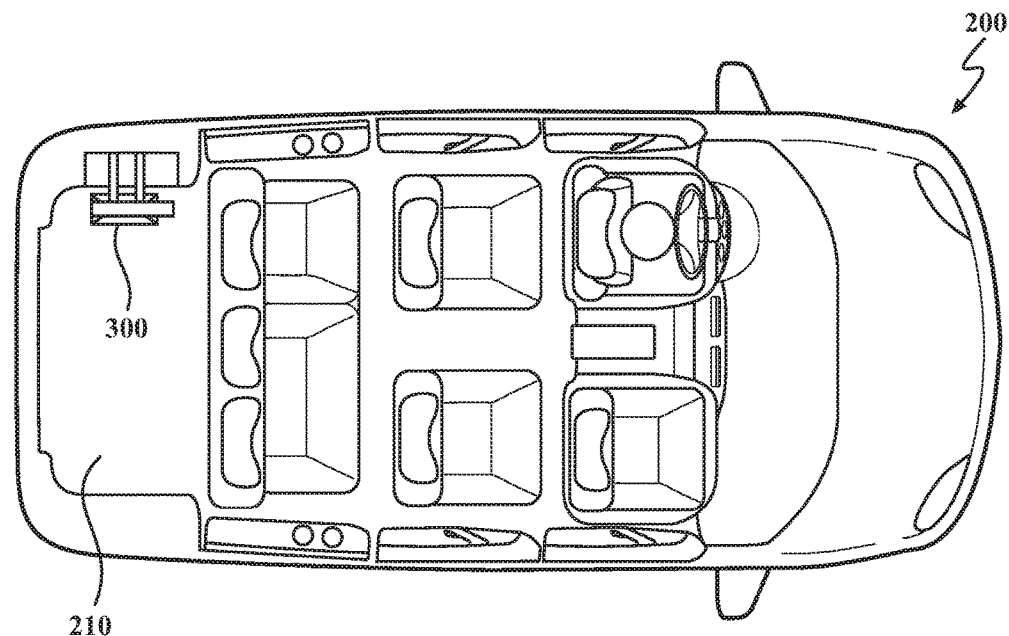
FIG. 5 is an example of the cargo assist arm in the process of moving into in a deployed position, showing the cargo assist arm moved laterally inward from the stowed position.
Figure 6:
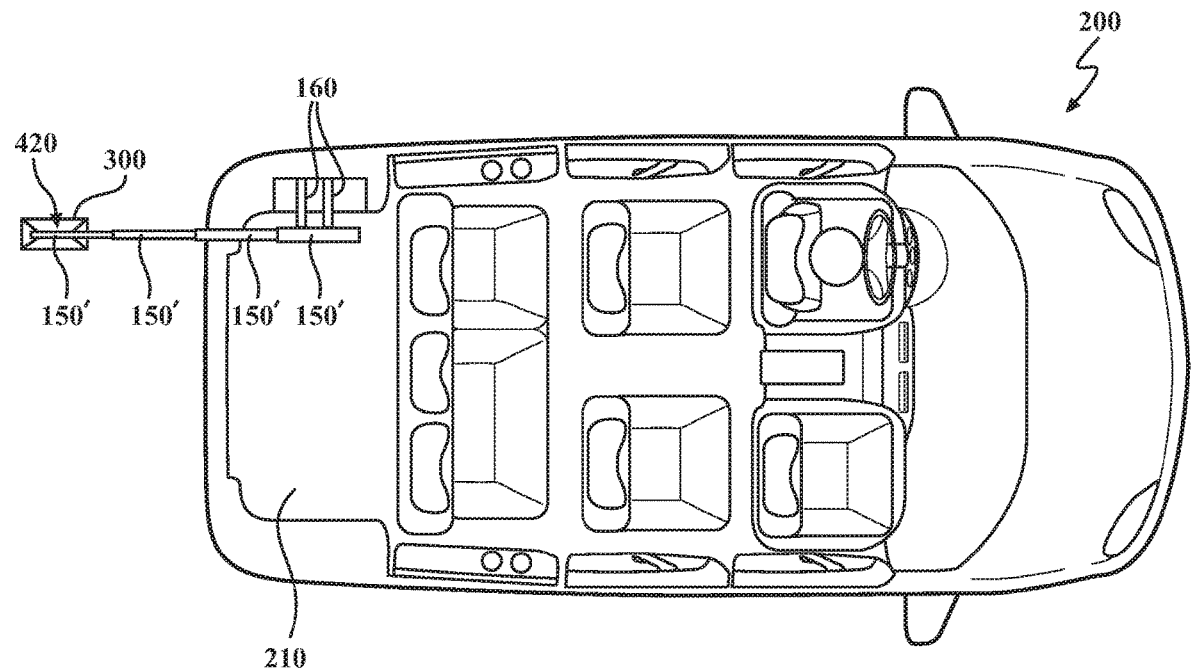
FIG. 6 is an example of the cargo assist arm in the deployed position, showing a portion of the cargo assist arm extending outside of the vehicle.

In another implementation, the cargo assist arm 150 can be initially moved laterally inward within the cargo space 210. An example of such motion is shown in FIG. 5. Once in the desired position, the length of the cargo assist arm 150 can be adjusted so that its length increases to the deployed position. Such adjusting of the length can be achieved by the telescopic movement of the arm segments 150' described above. An example of such motion is shown in FIG. 6. The motion of the cargo assist arm 150 shown in FIGS. 5 and 6 can be achieved by, for example, the actuator(s) 160 and/or the motor(s) 165.

In still another implementation, the cargo assist arm 150 may be positioned so that, directly from the stowed position, its length it can be adjusted so that its length increases to the deployed position. For instance, the location of the cargo assist arm 150 in FIG. 5 could in a different configuration represent the stowed position.

Figure 7:
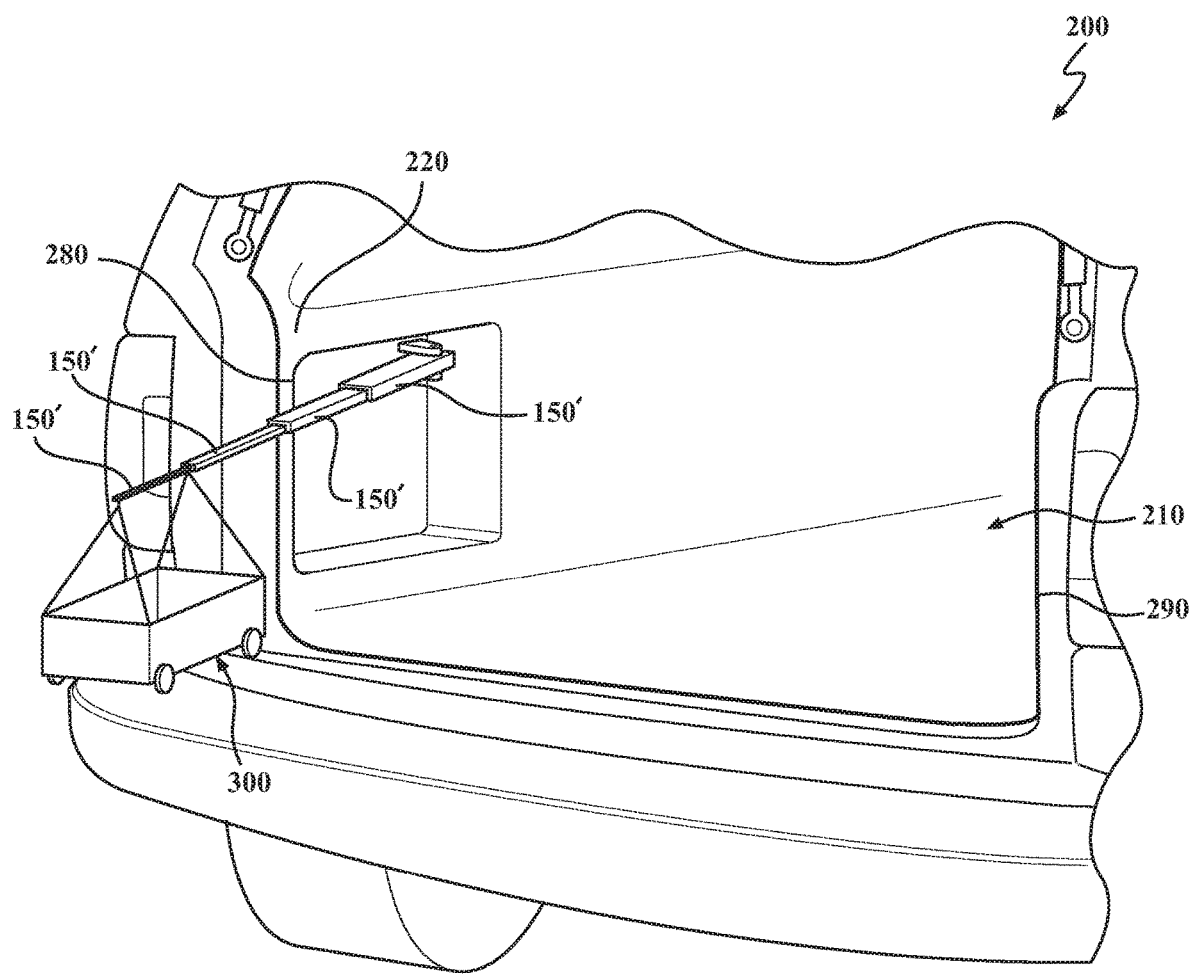
FIG. 7 is an example of the cargo assist arm in the deployed position, wherein a cargo carrier operatively connected to the cargo assist arm is in a raised elevational position.
Figure 8:
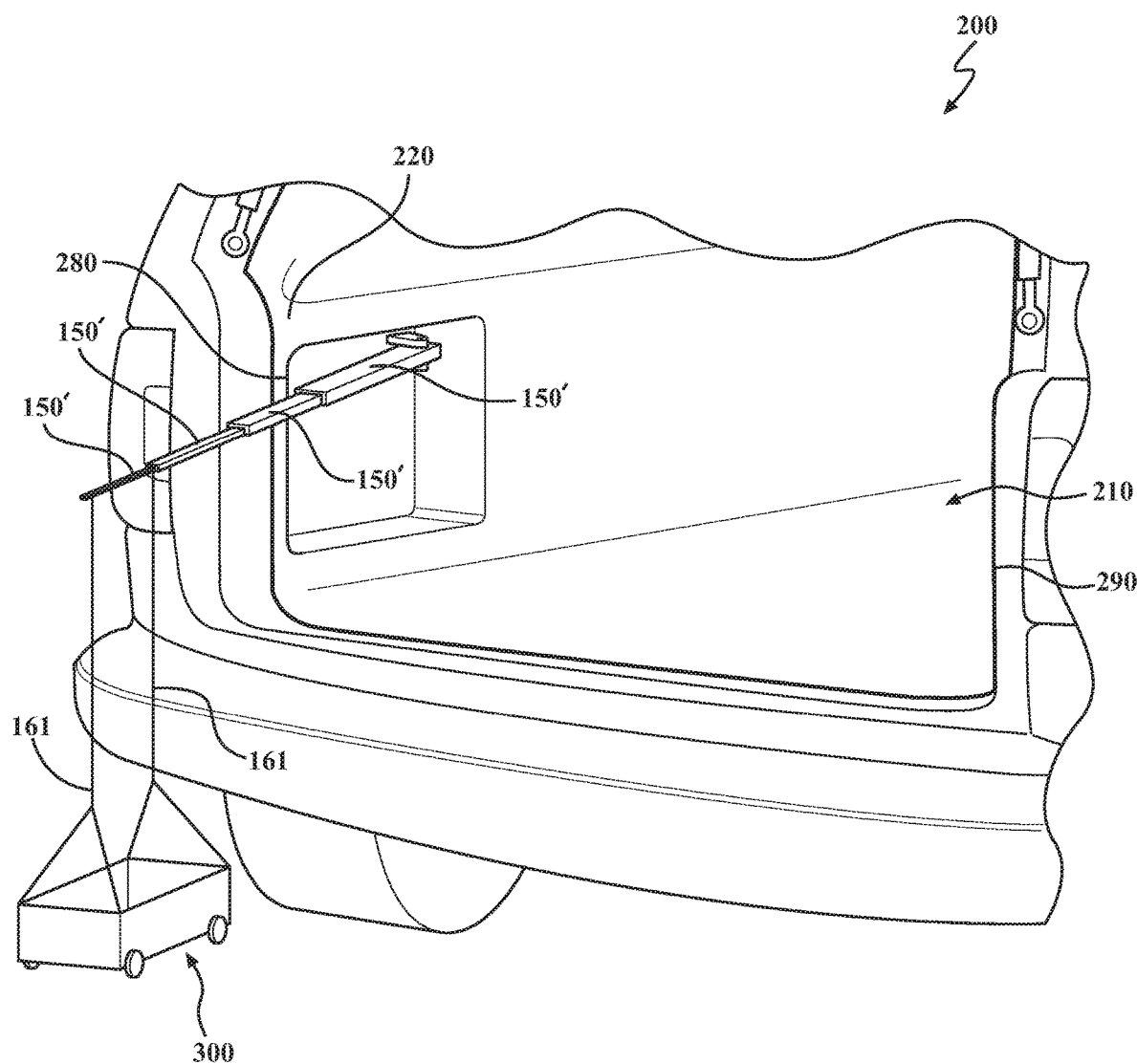
FIG. 8 is an example of the cargo assist arm in the deployed position, wherein the cargo carrier operatively connected to the cargo assist arm is in a lowered elevational position.

When in the deployed position, the cargo carrier 300 may be in a raised elevational position, that is, above the ground level. The cargo assist arm 150 can be configured to selectively lower and raise the cargo carrier 300 in the elevational direction. FIG. 7 shows an example in which the cargo carrier is in a raised elevational position, and FIG. 8 shows an example in which the cargo carrier 300 is in a lowered elevational position.

Such selective lowering and raising of the cargo carrier 300 can be achieved in any suitable manner, such as by the one or more actuators 160 and/or the one or more motors 165. In one implementation, the cargo assist arm 150 can include high strength rope, cable 161 (FIG. 8), tether, belt, or chain that can cooperate with one or more other elements (e.g., one or more pulleys) to enable the lowering and raising of the cargo carrier 300 in the elevational direction. In one or more arrangements, such high strength rope, cable 161, tether, belt, or chain can be operatively connected to any suitable portion of the cargo carrier 300 in any suitable manner. In some instances, such high strength rope, cable 161, tether, belt, or chain can include one or more connectors (e.g., hooks, clips, carabiners, fasteners, straps, etc.) to facilitate the operative connection to the cargo carrier 300. In some instances, the lowering and raising of the cargo carrier 300 can be achieved by manual manipulation of the cargo assist arm 150. It should be noted that, in the deployed position, the cargo carrier 300 can be located sufficiently away from the vehicle 200 to allow the cargo carrier 300 to be lowered and raised without interference or obstruction from the vehicle 200.

In addition to the stowed position and the deployed position, the cargo assist arm 150 can have one or more additional positions. For instance, in some arrangements, the cargo assist arm 150 can have one or more intermediate positions. In the intermediate position, the cargo assist arm 150 can be located be located entirely within the cargo space 210, but not in the stowed position. Thus, when the cargo assist arm 150 is in the intermediate position, the closing structure (e.g., the rear door 205) of the access opening 290 can be closed.

Figure 9:
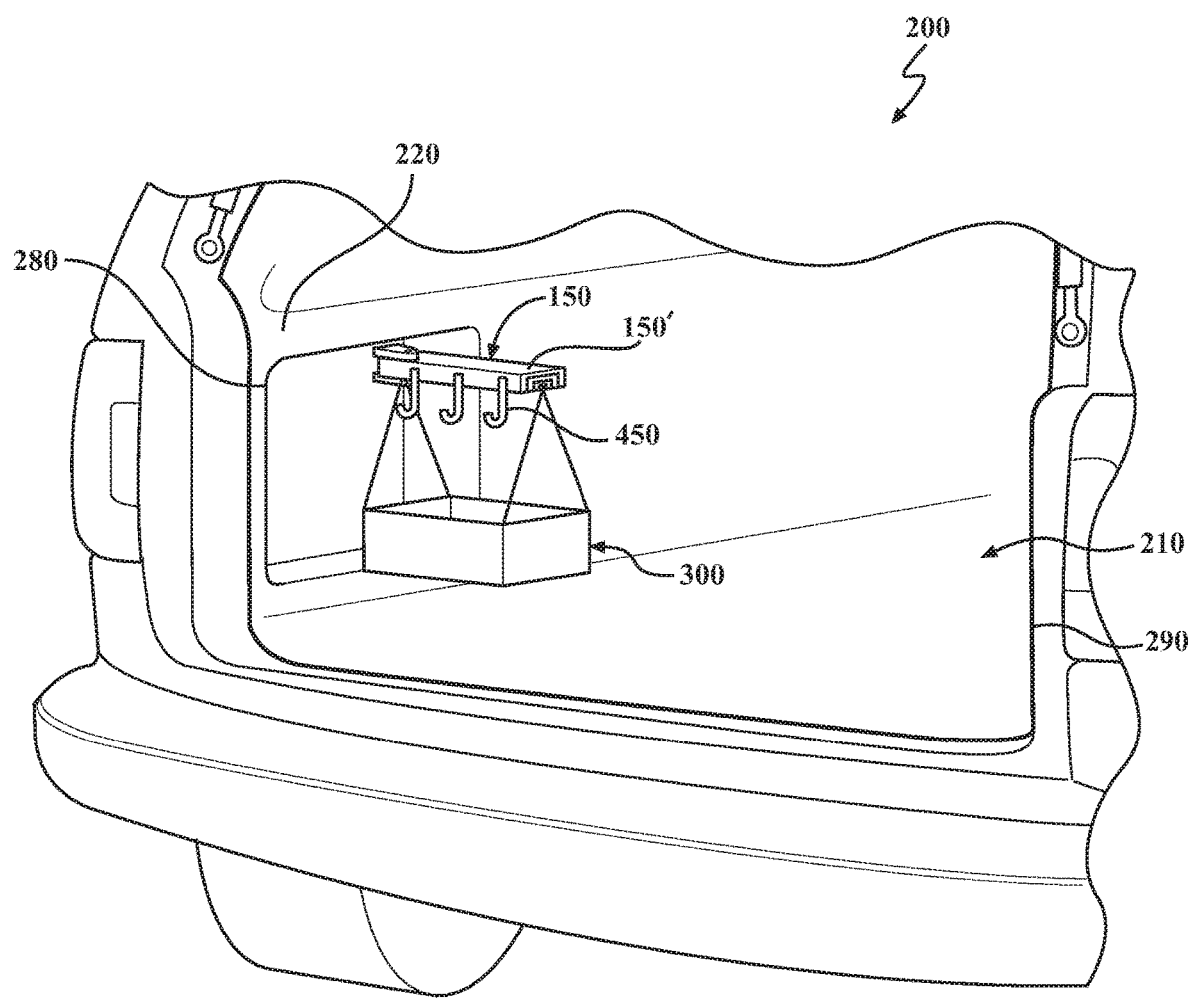
FIG. 9 is an example of the cargo assist arm in the process of moving into an intermediate position, showing the cargo assist arm pivoted about 90 degrees from the stowed position.
Figure 10:
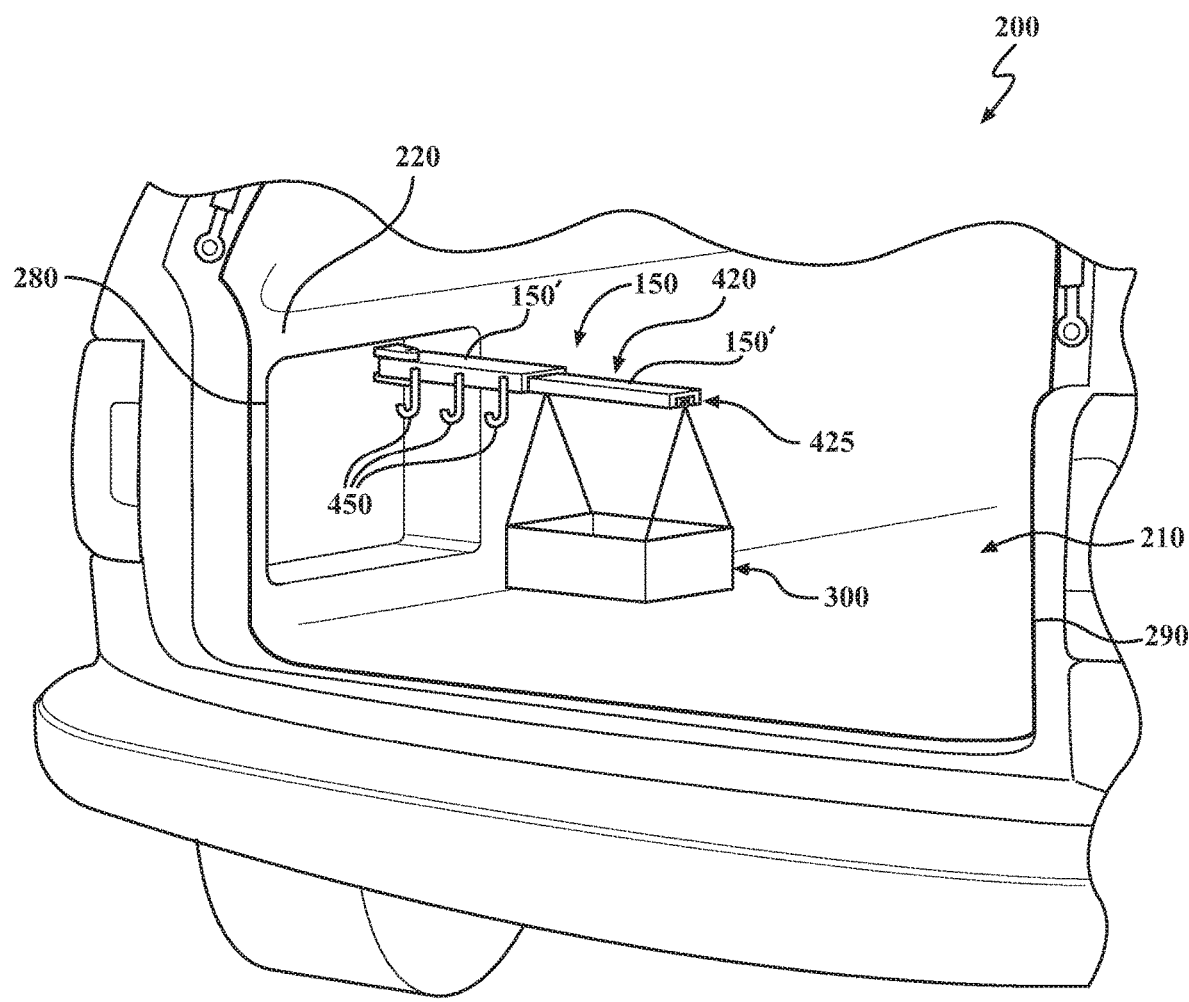
FIG. 10 is an example of the cargo assist arm in the intermediate position.

One example of an intermediate position is shown in FIGS. 9 and 10. In this example, the cargo assist arm 150 can extend laterally inward from the recess 280 and into the cargo space 210 toward the opposite lateral side wall, as is shown in FIG. 9. In such position, the cargo assist arm 150 can be oriented at substantially 90 degrees relative to the first lateral side wall 220. The cargo assist arm 150 can be moved in any suitable manner to achieve such a position. For instance, the cargo assist arm 150 can be pivoted about 90 degrees from the stowed position. Once in this position, the length of the cargo assist arm 150 can be increased to a desired length in a direction toward the opposite lateral side wall (e.g., the second lateral side wall 230), as is shown in FIG. 10. In one or more arrangements, the cargo assist arm 150 can be configured to extend entirely across the cargo space 210 in the lateral direction. In such case, the cargo assist arm 150 (e.g., the distal end 425) can engage a portion of the second lateral side wall 230. In the intermediate position, the cargo carrier 300 may be in a raised elevational position or in a lowered elevational position. In one or more arrangements, the cargo carrier 300 can be lowered so that it is supported by the floor 240 of the cargo space 210.

The cargo assist arm(s) 150 can have one or more additional features that can expand its uses. For instance, one or more attachment elements can be provided on the cargo assist arm(s) 150. The attachment elements can be formed with the cargo assist arm(s) 150 as a unitary structure, or the attachment elements can be operatively connected to the cargo assist arm(s) 150. In one or more arrangements, the attachments elements can be hooks 450 (see FIGS. 9 and 10), clips, connectors, posts, or other attachment structure. Such attachment elements can enable a user to attach cargo and/or other items to the cargo assist arm(s) 150.

In one or more arrangements, one or more visual indicators 180 can be provided on the cargo assist arm(s) 150. As an example, one or more light sources can be provided on the cargo assist arm(s) 150. The light source(s) can be used for various purposes. For instance, the one or more light source(s) can be used to provide warnings to a user, as described above in connection with the warning module(s) 190. Alternatively or in addition, the light source(s) can assist a user at night time and/or in poor lighting conditions. The user can selectively activate the light source(s) to assist the user in viewing the cargo assist arm(s) 150, the vehicle 200, the cargo carrier 300, the cargo, and/or the surrounding environment. A user input element can be provided on the cargo assist arm(s) 150 and/or in some other location to enable a user to selectively activate or deactivate the light source(s).

Further, it should be noted that, while the above description has been directed to an arrangement in which the cargo assist arm 150 is provided on one lateral side of the cargo space 210, it will be appreciated that, alternatively or in addition, a cargo assist arm 150 can be provided in other locations. For instance, the cargo assist arm 150 can be provided on an opposite lateral side wall of the cargo space 210 or in some other location (e.g., the floor 240, the ceiling 245, etc.). Further, a plurality of cargo assist arms 150 can be provided in the cargo space 210. In one or more arrangements, a cargo assist arm 150 can be provided on the first lateral side wall 220 and a cargo assist arm 150 can be provided on the second lateral side wall 230. In one or more arrangements, a plurality of cargo assist arms 150 can be provided on the same lateral side wall of the vehicle 200. When the vehicle 200 includes a plurality of cargo assist arms 150, the plurality of cargo assist arms 150 can be substantially identical to each other, or one or more of the cargo assist arms 150 can be different form the other cargo assist arms 150 in one or more respects.

Further, it will be appreciated that the cargo assist arms 150 can be configured so as to be usable regardless of whether the rear seats 270 of the vehicle 200 are up, folded down, or removed. In at least some instances, the rear seats 270 of the vehicle 200 can be moved into their various positions (e.g., up or folded down) and/or removed regardless of the position of the cargo assist arm(s) 150.

The cargo carrier 300 can have any suitable configuration. The cargo carrier 300 can be configured to receive one or more items therein. The cargo carrier 300 can be configured to facilitate the transport the one or more items. In one or more arrangements, the cargo carrier 300 can be configured as a hand basket or a shopping basket. In one or more arrangements, the cargo carrier 300 can be configured as a wagon. In one or more arrangements, the cargo carrier 300 can be configured as a dog crate or an animal carrier. In one or more arrangements, the cargo carrier 300 can be configured as a reusable grocery bag. In one or more arrangements, the cargo carrier 300 can be configured as a cooler. In one or more arrangements, the cargo carrier 300 can be configured as a duffel bag. In one or more arrangements, the cargo carrier 300 can be configured as luggage. In one or more arrangements, the cargo carrier 300 can be configured as a tote. In one or more arrangements, the cargo carrier 300 can be a crate.

In some instances, the cargo carrier 300 can may not necessarily be configured to receive other items. In some instances, the cargo carrier 300 can be an item itself. For example, in one or more arrangements, the cargo carrier 300 can be a four wheeler, all-terrain vehicle, dirt bike, go cart, bicycle, or moped. In one or more arrangements, the cargo carrier 300 can be a boat (e.g., a kayak), hovercraft, or raft. In one or more arrangements, the cargo carrier 300 can be a wheelchair, scooter, walker, or mobility assistance device. In one or more arrangements, the cargo carrier 300 can be a spare tire, including a full sized tire or a smaller tire. In one or more arrangements, the cargo carrier 300 can be a barbecue grill.

The cargo carrier 300 can be made of any suitable material. The cargo carrier 300 can be made of one or more durable materials that can carry loads. In one or more arrangements, the cargo carrier 300 can be made of metal, plastic, or a textile (e.g., canvas). In one or more arrangements, at least a portion of the cargo carrier 300 can be collapsible. As an example, in one or more arrangements, the cargo carrier 300 can have a rigid bottom surface, collapsible side walls, and an open top. In at least some arrangements, the cargo carrier 300 can be collapsed when in the stowed position.

In one or more arrangements, the cargo carrier 300 can include one or more features to facilitate transport by a person when used outside of the vehicle 200. For instance, the cargo carrier 300 can include a handle. In some instances, the handle can be a fixed handle. In some instances, one or more aspects of the handle can be selectively adjusted by a user, such as length and/or position. In some instances, the cargo carrier 300 can include one or more wheels, rollers, castors, and/or swivels to facilitate movement of the cargo carrier 300 on the ground or floor. In some arrangements, the one or more wheels, rollers, castors, and/or swivels can be configured to be selectively removed from the cargo carrier 300.

In one or more arrangements, the cargo carrier 300 can have an opening to allow a user to place items in the cargo carrier 300. As an example, the cargo carrier 300 can have an open top. In some arrangements, the opening of the cargo carrier 300 can be configured to be selectively opened and closed, such as by a door or panel. In some arrangements, the opening of the cargo carrier 300 may not be closable.

In one or more arrangements, the cargo carrier 300 can have any suitable appearance. In or more arrangements, the cargo carrier 300 can be provided in a color that substantially matches the interior color of the vehicle 200.

Figure 11:
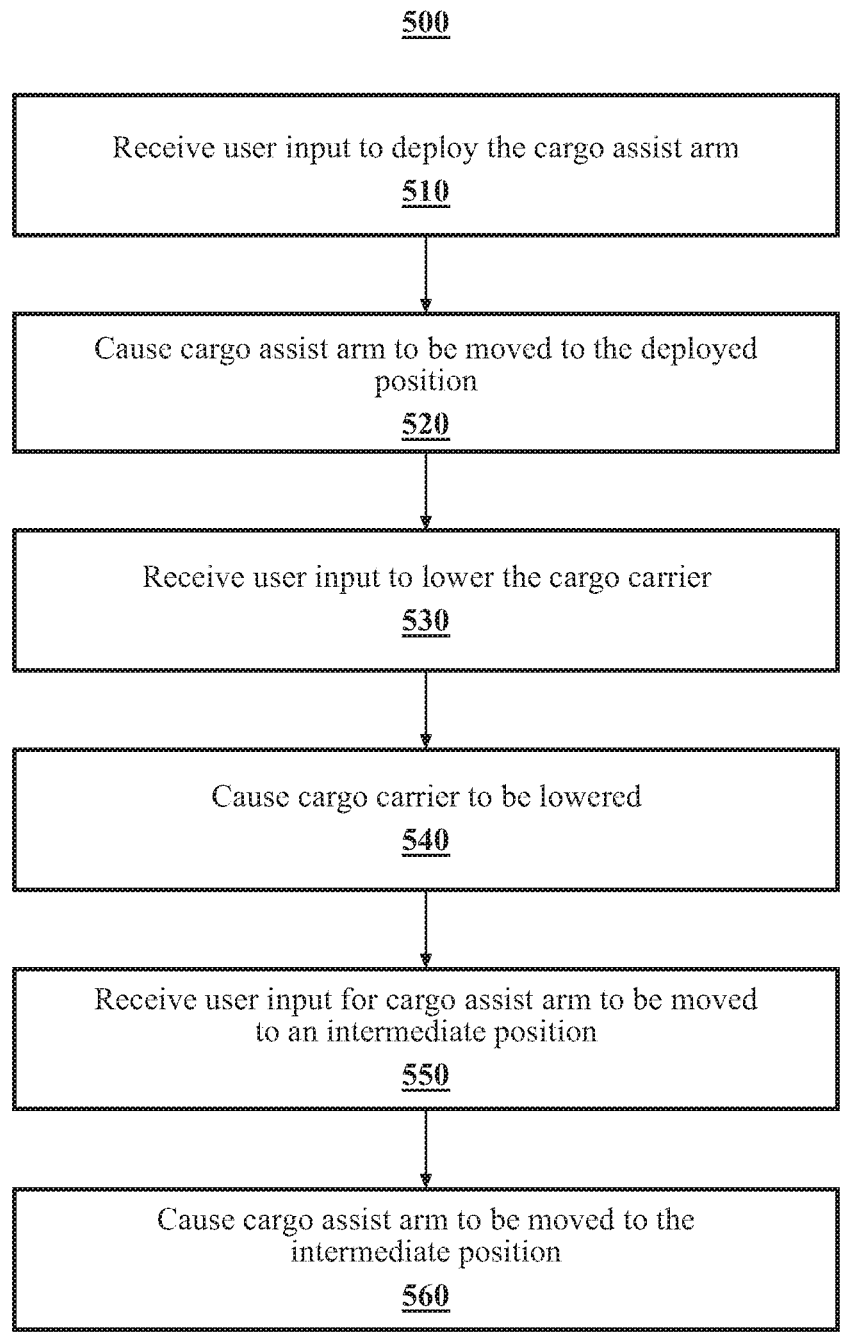
FIG. 11 is an example of a cargo assist method.

Now that the various potential systems, devices, elements and/or components have been described, one example of a cargo assist method will now be described. Referring to FIG. 11, an example of a method 500 is shown. Various possible steps of method 500 will now be described. The method 500 illustrated in FIG. 11 may be applicable to the embodiments described above in relation to FIGS. 1-10, but it is understood that the method 500 can be carried out with other suitable systems and arrangements. Moreover, the method 500 may include other steps, blocks and/or decision blocks that are not shown here, and in fact, the method 500 is not limited to including every step, block, or decision block shown in FIG. 11. The steps, blocks, and/or decision blocks that are illustrated here as part of the method 500 are not limited to this particular chronological order. Indeed, some of the steps, blocks and/or decision blocks may be performed in a different order than what is shown and/or at least some of the steps, blocks and/or decision blocks shown can occur simultaneously.

At block 510, a user input to deploy the cargo assist arm can be received. In one or more arrangements, the user input can be received via the input system 130, which can be provided on the vehicle 200 or on a portable device. For instance, the user can press a button provided within the vehicle 200 or on a key fob. In one or more arrangements, the user input can be provided by manually manipulating the cargo assist arm 150 and/or the cargo carrier 300. The method 500 can continue to block 520.

At block 520, responsive to receiving a user input to deploy the cargo assist arm 150, the cargo assist arm 150 can be caused to move from the stowed position to the deployed position. For instance, the cargo assist arm 150 can be caused to be moved by the processor(s) 110, the actuator(s) 160, and/or the motor(s) 165. Alternatively, the cargo assist arm 150 can be caused to be moved by the user's manual manipulation of the cargo assist arm 150 and/or the cargo carrier 300. In the deployed position, the cargo carrier 300 and at least a portion of the distal end region 420 of the cargo assist arm 150 can extend through the access opening 290 to the cargo space 210. The cargo carrier 300 and at least a portion of the distal end region 420 of the cargo assist arm 150 can be located outside of the vehicle 200. The cargo carrier 300 can be located above ground level in a raised elevational position. The method 500 can continue to block 530.

At block 530, a user input to lower the cargo carrier 300 can be received. The user input can be received via the input system 130. The input system 130 can be the same one in block 510, or it can be a different input system 130. Alternatively, the user input can be provided by manually manipulating the cargo assist arm 150 and/or the cargo carrier 300. The method 500 can continue to block 540.

At block 540, responsive to receiving a user input to lower the cargo carrier 300, the cargo carrier 300 can be caused to move downward in the elevational direction. For instance, the cargo assist arm 150 can be caused to be moved by the processor(s) 110, the actuator(s) 160, and/or the motor(s) 165. In one or more arrangements, the cargo carrier 300 can be lowered using one or more pulleys. Alternatively, the cargo assist arm 150 can be caused to be moved by the user's manual manipulation of the cargo assist arm 150 and/or the cargo carrier 300. In some instances, the cargo carrier 300 can be lowered in the elevation direction such that the cargo carrier 300 contacts a surface (e.g., the ground). In one or more arrangements, the downward movement of the cargo carrier 300 in the elevational direction can be stopped automatically or in response to receiving a user input to stop such movement.

At this point, a user may separate the cargo carrier 300 from the cargo assist arm 150. The user may use the cargo carrier 300 for any suitable purpose. As an example, the user can fill the cargo carrier 300 with one or more items. The user can return to the vehicle 200 with the cargo carrier 300. The user can place the cargo carrier 300 on the ground. The user can operatively connect the cargo carrier 300 to the cargo assist arm 150. The method 500 can continue to block 550.

At block 550, a user input to raise the cargo carrier 300 and/or to retract the cargo assist arm 150 can be received. The user input can be received via an input system 130. The input system 130 can be the same one in block 510 and/or block 530, or it can be a different input system 130. Alternatively, the user input can be provided by manually manipulating the cargo assist arm 150 and/or the cargo carrier 300. The method 500 can continue to block 560.

At block 560, the cargo assist arm 150 can be caused to move consistent with the user input. For instance, the cargo assist arm 150 can be caused to be moved by the processor(s) 110, the actuator(s) 160, and/or the motor(s) 165. Alternatively, such causing can be performed by the user's manual manipulation of the cargo assist arm 150. In the retracted position, the cargo carrier 300 and the distal end region 420 of the cargo assist arm 150 can be located within the cargo space 210. The cargo carrier 300 may be supported on the floor 240 of the cargo space 210, or it may be suspended above the floor 240 of the cargo space 210. The user can close the access opening 290 to the cargo space 210.

The method 500 can end. Alternatively, the method 500 can return to any of the above blocks, or it can continue to some other block.

A non-limiting example of the above-described systems, methods and/or arrangements will be described in relation to the above figures. For purposes of this example, the vehicle 200 can be a mini-van with a rear door 205 that, when open, allows a user to access the cargo space 210 from outside of the vehicle 200. For purposes of this example, the cargo assist arm 150 can begin in the stowed position. In this example, the cargo carrier 300 can be a grocery carrier (e.g., a reusable grocery bag).

The user may drive the vehicle 200 to a grocery store. When the vehicle 200 is parked, the user can open the rear door 205 of the vehicle 200. The user may remove the cargo carrier 300 while the cargo assist arm 150 is in the stowed position or when the cargo assist arm 150 is in a non-stowed position (e.g., the deployed position or an intermediate position).

The user can provide an input on the input system 130 to cause the cargo assist arm 150 to be moved into the deployed position or some other non-stowed position. When the cargo assist arm 150 has moved into the desired position, the user can separate the cargo carrier 300 from the cargo assist arm 150. If desired, the user can provide another input on the input system 130 to cause the cargo assist arm 150 to move into the stowed position or some other position in which the cargo assist arm 150 is located entirely within the cargo space 210 so that the user can close the rear door 205.

The user can take the cargo carrier 300 into the grocery store. While shopping, the user can place groceries in the cargo carrier 300. After purchasing the groceries, the user can return to the vehicle 200 with the cargo carrier 300 containing groceries therein. Consequently, the cargo carrier 300 may be heavy. Accordingly, the user can open the rear door 205 of the vehicle, and the user can provide an input on the input system 130 to cause the cargo assist arm 150 to move into the deployed position or some other non-stowed position. When the cargo assist arm 150 has moved into the deployed position, the user can operatively connect the cargo carrier 300 to the distal end region 420 of the cargo assist arm 150. The user may take such actions while the cargo carrier 300 is located on the ground or on some other surface (e.g., in a shopping cart).

The user can provide an input on the input system 130 to cause the cargo assist arm 150 to move to a transport position. The processor(s) 110, the actuator(s) 160, and/or the motor(s) 165 can cause the cargo assist arm 150 to move to the transport position. In this position, the cargo carrier 300 and the cargo assist arm 150 can be located entirely within the cargo space 210. The user can close the rear door 205 of the vehicle 200. The user can drive the vehicle 200 home. The engagement between the cargo assist arm 150 and the cargo carrier 300 may help to keep the cargo carrier 300 in an upright position during transport and minimize the likelihood of the cargo carrier 300 falling over and spilling its contents.

When the user arrives home, the user can deploy the cargo assist arm 150 as described above. The user can separate the cargo carrier 300 from the cargo assist arm 150. After the groceries are put away and the cargo carrier 300 can be operatively connected back to the cargo assist arm 150 (or even when the cargo carrier 300 is not operatively connected to the cargo assist arm 150), the user can provide an input for the cargo assist arm 150 to move to the stowed position. In such position, the cargo assist arm 150 and/or the cargo carrier 300 can be located out of the way so as to maximize the availability of the cargo space 210.

It will be appreciated that arrangements described herein can provide numerous benefits, including one or more of the benefits mentioned herein. For example, arrangements described herein can assist a user in loading cargo into and/or unloading cargo from a vehicle. Arrangements described herein can minimize strain, exertion, and/or injury of the user in performing such activities. Arrangements described herein can allow for compact storage of the cargo assist arm when not in use. Arrangements described herein can facilitate the safe transport of cargo. Arrangements described herein can provide convenience to users of a vehicle. Arrangements described herein can allow a user to make use of the cargo carrier even when the cargo assist arm is not deployed or otherwise in use. Arrangements described herein can potentially reduce the number of trips that a user needs to make to bring groceries or other cargo from the vehicle to a house.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A cargo assist system for a vehicle, the system comprising:
   a cargo space at least partially defined by a first lateral side wall and a second lateral side wall of the vehicle, a recess being defined in the first lateral side wall;
   a cargo assist arm, the cargo assist arm including a distal end region and a distal end, the cargo assist arm including:
     one of: a rope, a cable, a tether, a belt, or a chain; and
     a connector operatively connected to the one of the rope, the cable, the tether, the belt, or the chain; and
   a cargo carrier being operatively connected to the cargo assist arm by the connector, the cargo carrier being configured to receive one or more items therein, the cargo carrier being configured to transported by a person when used outside of the vehicle;
   the cargo assist arm being selectively movable between a plurality of positions, the plurality of positions including a stowed position and a deployed position,
   when the cargo assist arm is in the stowed position, the cargo assist arm being located entirely within the cargo space such that at least a majority of the cargo assist arm and at least a majority of the cargo carrier are received within the recess, the recess being configured to retain the cargo assist arm or the cargo carrier therein when in the stowed position by at least one of:
one or more connectors, one or more fasteners, one or more straps, one or more tie downs, one or more bungee cords, one or more tethers, or one or more locking elements; and
frictional engagement,
when the cargo assist arm is in the deployed position, the cargo carrier and the distal end region of the cargo assist arm extend through an access opening to the cargo space and are located outside of the vehicle,
the cargo assist arm being configured to selectively lower and raise the cargo carrier in an elevational direction, via the one of the rope, the cable, the tether, the belt, or the chain, at least when the cargo assist arm is in the deployed position or anon-stowed position.

2. The system of claim 1, further including:
one or more processors operatively connected to control the cargo assist arm; and
an input interface provided on the vehicle, wherein the input interface is configured to receive inputs from a user to cause the cargo assist arm to be selectively moved to a selected one of the plurality of positions, and wherein the input interface is operatively connected to the one or more processors.

3. The system of claim 1, further including:
one or more actuators operatively connected to the cargo assist arm, the one or more actuators configured to cause the cargo assist arm to move between the plurality of positions.

4. The system of claim 1, wherein the cargo assist arm has a length, wherein the length is adjustable, wherein the cargo assist arm has a first length in the stowed position, wherein the cargo assist arm has a second length in the deployed position, and wherein the second length is greater than the first length.

5. The system of claim 4, wherein the cargo assist arm includes a plurality of arm segments, and wherein the length of the cargo assist arm is adjusted by telescopic motion of the plurality of arm segments of the cargo assist arm.

6. The system of claim 1, further including one or more actuators, wherein the cargo assist arm is configured to selectively lower and raise the cargo carrier in the elevational direction, via the one of the rope, the cable, the tether, the belt, or the chain, when the cargo assist arm is in the deployed position or the non-stowed position using at least in part the one or more actuators.

7. The system of claim 1, wherein the cargo carrier is one of a cart, a grocery bag, or an animal carrier.

8. The system of claim 1, wherein one or more attachment elements are provided on a side of the cargo assist arm, whereby items can be supported on the cargo assist arm by a user.

9. The system of claim 1, wherein the connector is at least one of a hook, a clip, a carabiner, a fastener, or a strap.

10. A cargo assist system for a vehicle, the system comprising:
a cargo space at least partially defined by a first lateral side wall and a second lateral side wall of the vehicle, a recess being defined in the first lateral side wall;
a cargo assist arm, the cargo assist arm including a distal end region and a distal end;
a cargo carrier being operatively connected to the distal end region of the cargo assist arm;
the cargo assist arm being selectively movable between a plurality of positions, the plurality of positions including a stowed position and a deployed position,
when the cargo assist arm is in the stowed position, the cargo assist arm being located entirely within the cargo space such that at least a portion of the cargo assist arm and at least a portion of the cargo carrier are received within the recess,
when the cargo assist arm is in the deployed position, the cargo carrier and the distal end region of the cargo assist arm extend through an access opening to the cargo space and are located outside of the vehicle;
one or more processors operatively connected to control the cargo assist arm;
one or more light sources, the one or more light sources being operatively connected to the one more processors; and
one or more load sensors configured to determine a load imposed by the cargo carrier and any items located therein, wherein the load sensor being operatively connected to the one or more processors, wherein the one or more processors are being configured to:
compare a determined load of the cargo carrier and any items therein to a predetermined load threshold; and
when the determined load is greater than the predetermined load threshold, provide a warning to a user by activating the one or more light sources, whereby a visual warning is provided to the user.

11. The system of claim 10, wherein the one or more light sources are located on the cargo assist arm.

12. A cargo assist method for a vehicle, the vehicle including a cargo space at least partially defined by a first lateral side wall and a second lateral side wall of the vehicle, a recess being defined in the first lateral side wall, the vehicle including a cargo assist arm having a distal end region and a distal end, the cargo assist arm including one of a rope, a cable, a tether, a belt, or a chain and a connector operatively connected to the one of the rope, the cable, the tether, the belt, or the chain; a cargo carrier being operatively connected to the cargo assist arm by the connector, the connector being configured for operatively connection to the cargo carrier, the cargo carrier being configured to receive one or more items therein, the cargo carrier being configured to transported by a person when used outside of the vehicle, the cargo assist arm being selectively movable between a plurality of positions including a stowed position in which the cargo assist arm is located entirely within the cargo space such that at least a majority of the cargo assist arm and at least a majority of the cargo carrier are received within the recess, the recess being configured to retain the cargo assist arm or the cargo carrier therein when in the stowed position by at least one of: one or more connectors, one or more fasteners, one or more straps, one or more tie downs, one or more bungee cords, one or more tethers, or one or more locking elements; and frictional engagement, the method including:
responsive to receiving a user input to deploy the cargo assist arm, causing the cargo assist arm to move from the stowed position to a deployed position, wherein, in the deployed position, the cargo carrier and the distal end region of the cargo assist arm extend through an access opening to the cargo space and are located outside of the vehicle.

13. The method of claim 12, further including:
receiving the user input to deploy the cargo assist arm via an input interface provided on the vehicle.

14. The method of claim 12, wherein the cargo assist arm has a length, wherein the length is adjustable, wherein the cargo assist arm has a first length in the stowed position, wherein the cargo assist arm has a second length in the deployed position, and wherein the second length is greater than the first length.

15. The method of claim 14, wherein the cargo assist arm includes a plurality of arm segments, and wherein the length of the cargo assist arm is adjusted by telescopic motion of the cargo assist arm.

16. The method of claim 12, wherein causing the cargo assist arm to move from the stowed position to the deployed position is performed using at least one of: one or more motors or one or more actuators.

17. The method of claim 12, further including causing the cargo carrier to be lowered in an elevational direction when the cargo assist arm is in the deployed position.

18. The method of claim 17, wherein causing the cargo carrier to be lowered in the elevation direction is performed using one or more actuators.

19. The method of claim 17, wherein causing the cargo carrier to be lowered in the elevation direction includes causing the cargo carrier to be lowered in the elevation direction such that the cargo carrier contacts a surface.

20. A cargo assist method for a vehicle, the vehicle including a cargo space at least partially defined by a first lateral side wall and a second lateral side wall of the vehicle, a recess being defined in the first lateral side wall, the vehicle including a cargo assist arm having a distal end region and a distal end, a cargo carrier being operatively connected to the distal end region of the cargo assist arm, the cargo assist arm being selectively movable between a plurality of positions including a stowed position in which the cargo assist arm is located entirely within the cargo space such that at least a portion of the cargo assist arm and at least a portion of the cargo carrier are received within the recess, the method including:
- responsive to receiving a user input to deploy the cargo assist arm, causing the cargo assist arm to move from the stowed position to a deployed position, wherein, in the deployed position, the cargo carrier and the distal end region of the cargo assist arm extend through an access opening to the cargo space and are located outside of the vehicle;
- determining a load of the cargo carrier and any items located therein;
- comparing a determined load to a predetermined load threshold; and
- when the determined load is greater than the predetermined load threshold, causing a warning to be presented to a user by activating one or more light sources, whereby a visual warning is provided to the user.

21. The method of claim 20, wherein the one or more light sources are located on the cargo assist arm.

22. A cargo assist system for a vehicle, the system comprising:
- a cargo space at least partially defined by a first lateral side wall and a second lateral side wall of the vehicle, a recess being defined in the first lateral side wall;
- a cargo assist arm, the cargo assist arm including a distal end region and a distal end;
- the cargo assist arm being selectively movable between a plurality of positions, the plurality of positions including a stowed position and a deployed position,
  when the cargo assist arm is in the stowed position, the cargo assist arm being located entirely within the cargo space such that at least a portion of the cargo assist arm is received within the recess,
  when the cargo assist arm is in the deployed position, the distal end region of the cargo assist arm extends through an access opening to the cargo space and is located outside of the vehicle;
- one or more processors operatively connected to control the cargo assist arm; and
- one or more cargo space access opening sensors operatively connected to the one or more processors, the one or more processors being configured to:
  - determine, based on data acquired by the one or more cargo space access opening sensors, whether the access opening to the cargo space of the vehicle is sufficiently open; and
  - responsive to determining that the cargo space of the vehicle is not sufficiently open:
    - causing a warning to be presented to a user; or
    - ignore or cancel a user input that would cause a movement of the cargo assist arm to the deployed position.

23. The system of claim 22, further including a cargo carrier operatively connected to the distal end region of the cargo assist arm,
- wherein, when the cargo assist arm is in the stowed position, at least a portion of the cargo carrier are is received within the recess, and
- wherein, when the cargo assist arm is in the deployed position, the cargo carrier extends through the access opening to the cargo space and is located outside of the vehicle.

24. A cargo assist method for a vehicle, the vehicle including a cargo space at least partially defined by a first lateral side wall and a second lateral side wall of the vehicle, a recess being defined in the first lateral side wall, the vehicle including a cargo assist arm having a distal end region and a distal end, the cargo assist arm being selectively movable between a plurality of positions including a stowed position in which the cargo assist arm is located entirely within the cargo space such that at least a portion of the cargo assist arm is received within the recess, the method including:
- responsive to receiving a user input to deploy the cargo assist arm, causing the cargo assist arm to move from the stowed position to a deployed position, wherein, in the deployed position, the distal end region of the cargo assist arm extends through an access opening to the cargo space and are located outside of the vehicle;
- determining whether the access opening to the cargo space of the vehicle is sufficiently open; and
- responsive to determining that the cargo space of the vehicle is not sufficiently open:
  - causing a warning to be presented to a user; or
  - ignoring or canceling the user input that would cause a movement of the cargo assist arm to the deployed position.

25. The method of claim 24, further including a cargo carrier operatively connected to the distal end region of the cargo assist arm, wherein, in the stowed position, at least a portion of the cargo carrier is received within the recess.

* * * * *

UNITED STATES PATENT AND TRADEMARK OFFICE
CERTIFICATE OF CORRECTION

PATENT NO. : 10,800,313 B2
APPLICATION NO. : 15/883356
DATED : October 13, 2020
INVENTOR(S) : Scott L. Frederick, Scott P. Robison and Paxton S. Williams Page 1 of 1

It is certified that error appears in the above-identified patent and that said Letters Patent is hereby corrected as shown below:

In the Claims

Claim 1, Column 17, Line 19: delete "anon-stowed" and insert --a non-stowed--

Signed and Sealed this
Twenty-ninth Day of December, 2020

Andrei Iancu
*Director of the United States Patent and Trademark Office*